United States Patent [19]

Yamaguchi

[11] 4,398,221
[45] Aug. 9, 1983

[54] FACSIMILE APPARATUS
[75] Inventor: Shingo Yamaguchi, Tokyo, Japan
[73] Assignee: Ricoh Company, Ltd., Tokyo, Japan
[21] Appl. No.: 296,034
[22] Filed: Aug. 25, 1981
[30] Foreign Application Priority Data Sep. 1, 1980 [JP] Japan ............................... 55-119819
Sep. 1, 1980 [JP] Japan ............................... 55-119820

[51] Int. Cl.³ .............................................. H04H 1/40
[52] U.S. Cl. .................................. 358/280; 358/264; 358/213; 358/294
[58] Field of Search ............... 358/280, 260, 261, 264, 358/265, 212, 213, 294; 364/415

[56] References Cited
U.S. PATENT DOCUMENTS 3,499,975  3/1970  Arps ..................... 358/260
3,622,695  11/1971 Rugaber ................ 358/260
4,296,440  10/1981 Rosenheck ............ 358/264
4,297,727  10/1981 Ogawa et al. ......... 358/261

Primary Examiner—Robert L. Griffin
Assistant Examiner—Edward L. Coles
Attorney, Agent, or Firm—David G. Alexander

[57] ABSTRACT

A horizontal scan sync signal is generated at every predetermined time interval allowing for a time period necessary for one line of video data to be stored in a RAM. In response to the horizontal scan sync signal, a video signal is transferred in parallel to a shift register inside a solid scanning element. When a microprocessor or CPU has failed to take in video data within a predetermined period of time after the appearance of the horizontal scan sync signal, shift clock pulses are forcibly generated so that a video signal is coupled from the solid scanning element to a binary circuit.

The interval between successive horizontal sync signals, in response to which the CPU takes in each line of video data, may be made relatively short to schedule artificial periods in which the CPU does not take in any video data. By utilizing such a specific period, the components of a video signal output of the solid scanning element which appear within a given period can be processed to prepare a threshold value.

14 Claims, 6 Drawing Figures

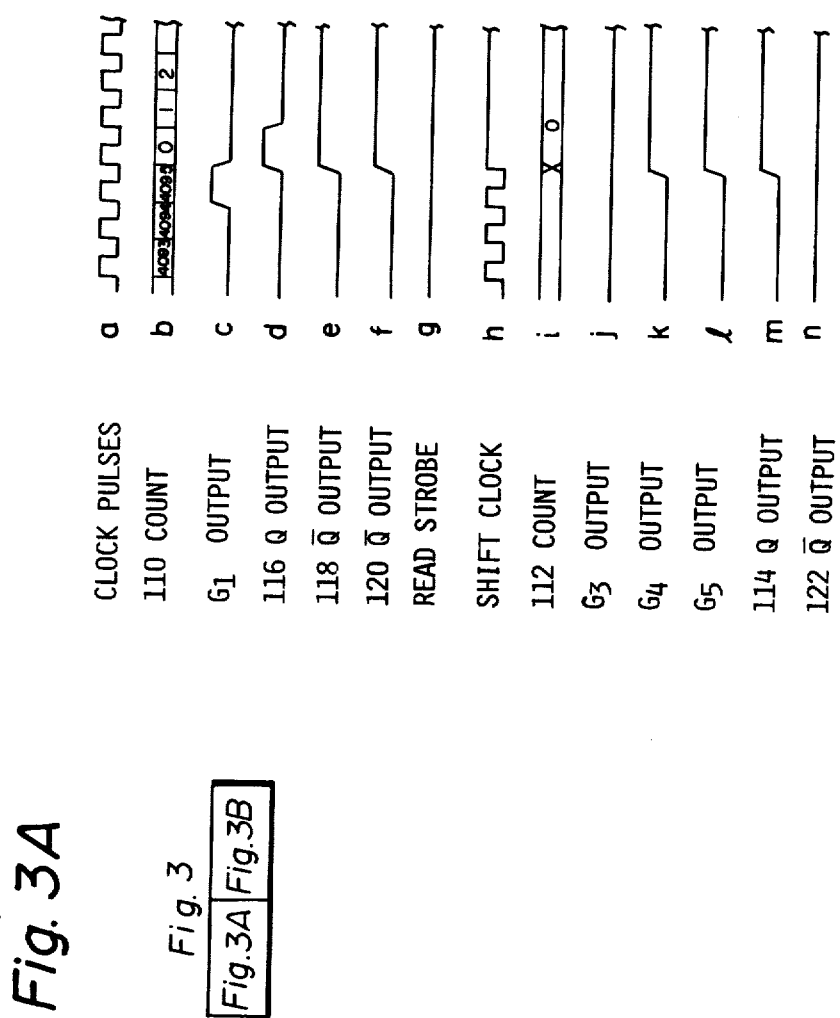

FACSIMILE APPARATUS

BACKGROUND OF THE INVENTION

The present invention relates to a facsimile apparatus of the type having a microprocessor and, more particularly, to a control device for controlling a serial to parallel converter which transfers a serial video data output of a scanner into parallel video data each having a plurality of data bits.

A current trend in the art of facsimile communication is to the development of a facsimile apparatus which allots all the data processing functions such as data compression to be performed therein to a microprocessor or CPU built in a microcomputer. Such a facsimile apparatus will achieve a cut-down in the overall size and production cost thereof.

In a facsimile apparatus of the type described, a scanner comprising a solid scanning element and others produces serial video data. These data are fed to a serial to parallel converter to be transformed into parallel data each having a predetermined number of data bits. A CPU takes in the parallel data in sequence based on a program stored in a read only memory or ROM, and stores one line of such parallel data in a random access memory or RAM. Meanwhile, one line of parallel data previously stored in the RAM are taken out therefrom and coded sequentially. These coded parallel data are re-stored in the RAM and then coupled sequentially to a parallel to serial converter which functions to transform the input parallel data back into a serial format. The eventual serial data are fed to a modem and therethrough to a transmission line.

In this type of prior art facsimile apparatus, sync signals are produced at predetermined intervals so that video signals are transferred in parallel relation to a shift register inside the solid scanning element or scanner. After one line of video data in the RAM have been coded by the CPU, high-speed shift clock pulses are supplied to the shift register inside the scanner to unload the same. The one line of video data thus outputted from this shift register are stored in the RAM via the serial to parallel converter.

However, such a system requires a substantial period of time for fully coding one line of video data. If therefore the CPU fails to code one line of data before the appearance of the next sync signal, only the parallel transfer of a video signal to the shift register will be repeated within the scanner. Video signals superposed on the shift register would result in delivery of incorrect outputs. Moreover, a binary circuit in this situation will not be supplied with video signals at constant time intervals whereby the output voltage of a peak hold circuit will be such lowered as to prevent a proper binary signal from being produced.

A video signal outputted from the scanner often includes needless components such as one which corresponds to a document presser plate. The prior art apparatus is designed to cut off such needless signal components by means of the CPU. This, however, requires an additional processing time and an additional storage capacity.

SUMMARY OF THE INVENTION

It is an object of the present invention to overcome the various drawbacks inherent in the prior art facsimile apparatus and provide an improved facsimile apparatus which can always store correct video data in a RAM by each plurality of bits in parallel.

In one aspect of the present invention, a horizontal scan sync signal is generated at every predetermined time interval allowing for a time period necessary for one line of video data to be stored in a RAM. In response to the horizontal scan sync signal, a video signal is transferred in parallel to a shift register inside a solid scanning element. When a microprocessor or CPU has failed to take in video data within a predetermined period of time after the appearance of the horizontal scan sync signal, shift clock pulses are forcibly generated so that the video signal is coupled from the solid scanning element to a binary circuit.

In another aspect of the present invention, the interval between successive horizontal scan sync signals, in response to which the CPU takes in each line of video data, is made relatively short to schedule artificial periods in which the CPU does not take in any video data. By utilizing such a specific period, the components of a video signal output of the solid scanning element which appear within a given period are processed to prepare a threshold value.

A facsimile apparatus embodying the present invention is provided with a random access memory and a microprocessor for encoding data from the random access memory, and comprises scanner means for producing a serial image or video data output, binary circuit means for producing a serial binary video data output from the serial video data output of the scanner means, serial to parallel converter means for converting the serial binary video data output to a parallel binary video data output, the microprocessor being constructed to produce a read strobe when the parallel binary video data output can be inputted to the random access memory after encoding the previous data from the random access memory, sync signal generator means for producing a sync signal at a predetermined interval, shift clock pulse generator means for producing shift clock pulses in response to the read strobe from the microprocessor, the scanner being constructed to feed the serial video data output to the binary circuit means in response to the shift clock pulses, and control means for controlling the shift clock pulse generator to forcibly produce the shift clock pulses which are fed to the scanner means whether or not the parallel binary data output can be inputted to the random access memory.

Other objects, together with the foregoing, are attained in the embodiment described in the following description and illustrated in the accompanying drawings.

DESCRIPTION OF THE PREFERRED EMBODIMENTS

While the facsimile apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
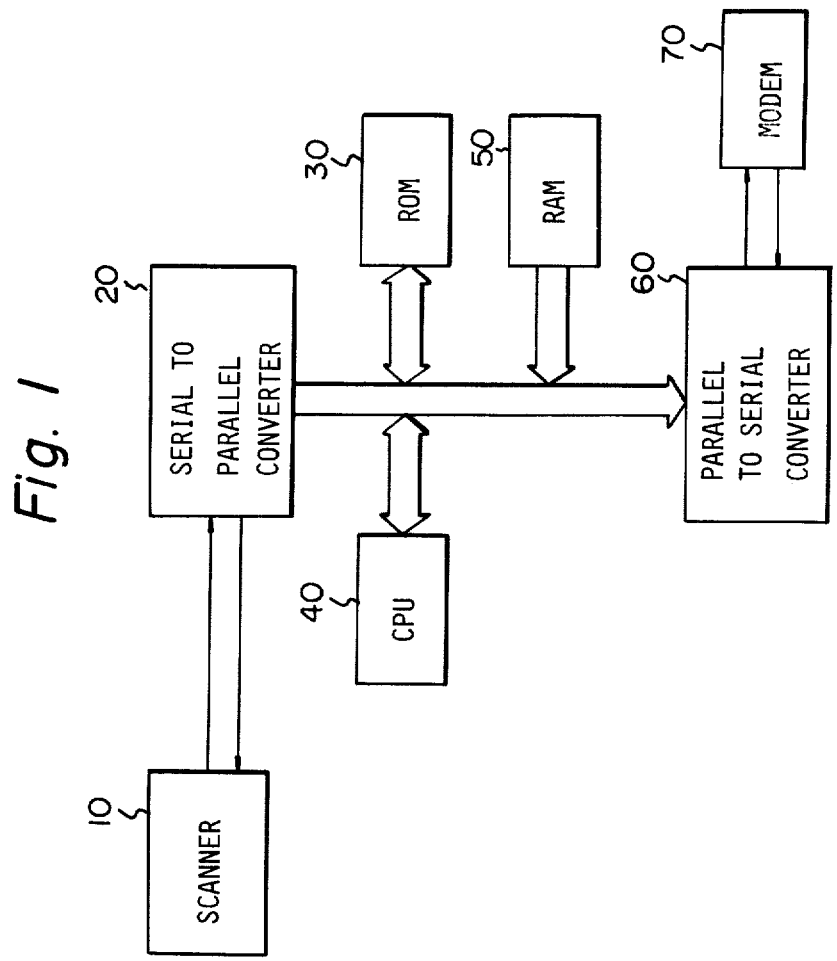
FIG. 1 is a block diagram showing a general construction of a facsimile apparatus according to the present invention.

Referring first to FIG. 1 of the drawings, the facsimile apparatus includes a scanner 10 which may comprise a CCD or like solid scanning element. A serial video signal output of the scanner 10 is coupled to a serial to parallel converter 20 to be thereby transformed into parallel data each having a predetermined number of bits. A read only memory of ROM 30 stores a predetermined program therein. Based on this program, a microprocessor or CPU 40 takes in the parallel data from the serial to parallel converter 20 in succession while storing one line of such data in a random access memory or RAM 50. Meanwhile, one line of parallel data previously stored in the RAM 50 are drawn out sequentially and coded by the CPU 40. Each predetermined number of bits of coded parallel data are again stored in the RAM 50 and coupled therefrom to a parallel to serial converter 60 in sequence. The data are converted by the converter 60 into a serial format and fed to a modem 70 which will deliver them to a transmission line.

It will be apparent to those skilled in this art that the converters 20 and 60 constitute interfaces individually while the ROM 30, CPU 40 and RAM 50 may be built in a microcomputer.

Figure 2A:
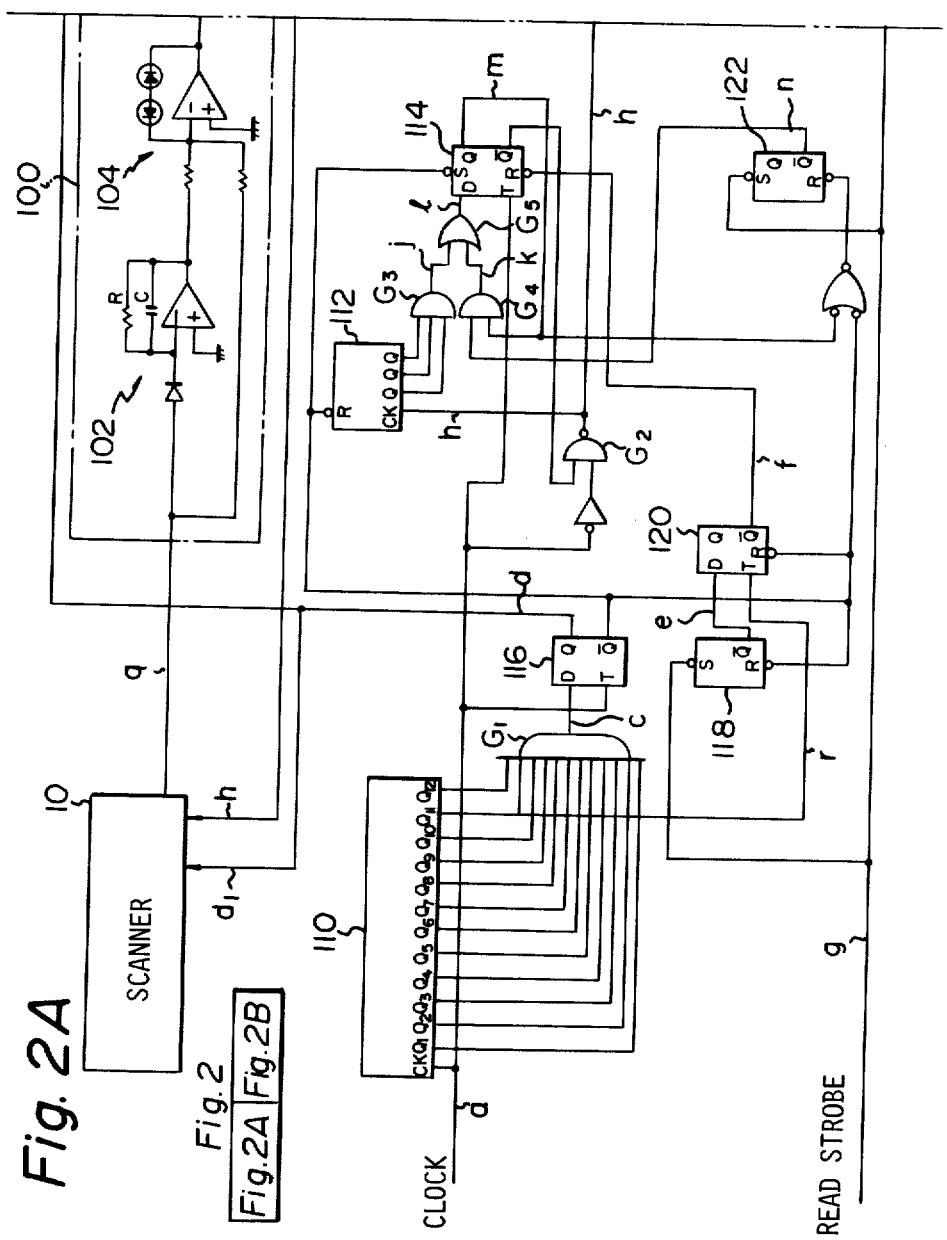
FIG. 2 is a diagram showing a scanner, a serial to parallel converter and a control circuit for the converter of a facsimile apparatus embodying the present invention.
Figure 2B:
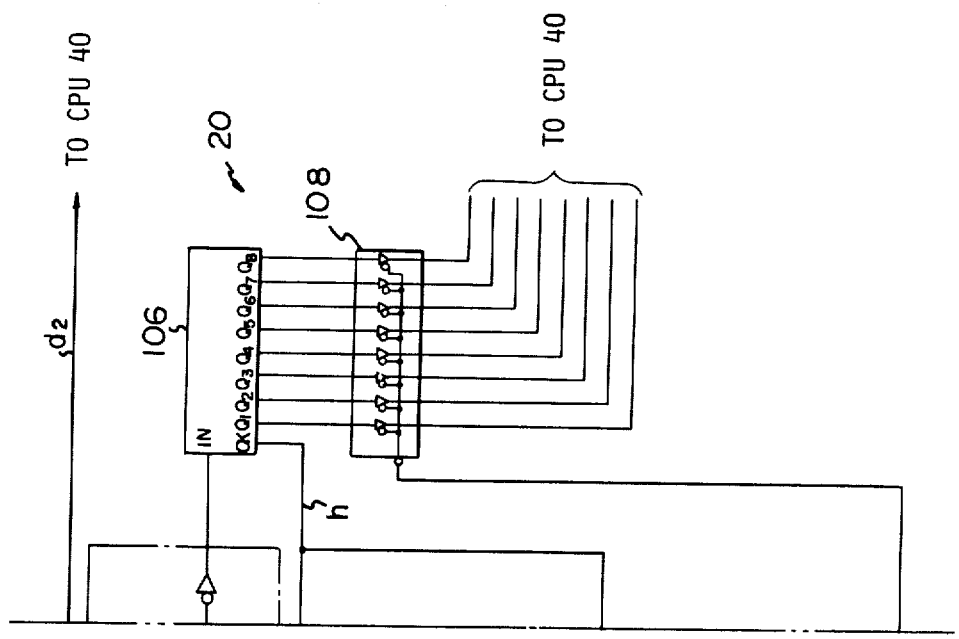

A practical arrangement of the serial to parallel converter 20 and its associated control circuit is illustrated in FIG. 2. In FIG. 2, generally denoted by the reference numeral 100 is a binary circuit which comprises a peak hold circuit 102 and a comparator circuit 104. The serial to parallel converter 20 is made up of a serial to parallel conversion register 106 and a tri-state buffer 108. Other circuit elements shown in FIG. 2 are a 12-bit timing counter 110, a 3-bit timing counter 112, a register full flag 114, a line sync flag 116, a first read stroke latch 118, a free run mode flag 120 and a second read strobe latch 122.

Figure 3B:
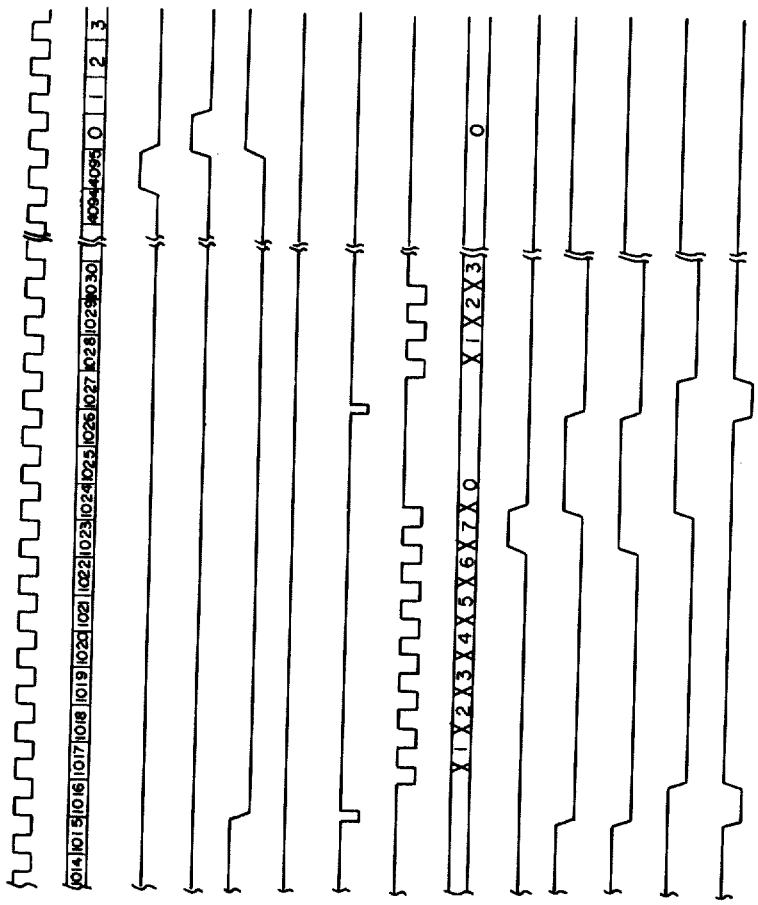
FIGS. 3 and 4 are timing charts demonstrating the operation of the facsimile apparatus of FIG. 2.

FIG. 3 is a timing chart demonstrating the operations of the various elements and networks shown in FIG. 2. The 12-bit timing counter 110 counts up clock pulses a coupled thereto continuously. Every time the counter b at the counter 110 reaches "4096", the counter 110 opens a gate $G_1$ to supply the line sync flag 116 with its output c. The line sync flag 116 produces an output d in response to the input c from the counter 110, that is, outputs d of the line sync flag 116 appear at given intervals which correspond to those of the outputs c of the counter 110. The output d of the line sync flag 116 is fed to the scanner 10 as a parallel transfer clock pulse $d_1$ whereby a video signal is transferred in parallel to the shift register inside the scanner 10.

At the same time, the output d of the line sync flag 116 is passed as a horizontal scan sync signal $d_2$ to the CPU 40 to thereby interrupt the CPU. If the CPU 40 has fully coded one line of previously inputted video data and is ready to take the next one line of video data in the RAM 50, it will deliver a read strobe g to the circuitry of FIG. 2 in response to the input signal $d_2$. If the CPU 40 is not ready to do so, the read strobe g will not appear therefrom until the next horizontal scan sync signal $d_2$ is coupled thereto. Thus, when the CPU 40 is prepared to take in video data, a read strobe g will necessarily appear within a predetermined period of time after the appearance of a horizontal scan sync signal $d_2$.

In response to a read strobe g, the $\overline{Q}$ output n of the read strobe latch 122 turns into logical "0" and this output n is fed to a gate $G_4$ whose output k is coupled to a gate $G_5$ whose output l is in turn coupled to the register full flag 114 to reset it. Consequently, a gate $G_2$ is opened to supply shift clock pulses h to the scanner 10 and serial to parallel conversion register 106.

The timing or bit counter 112 counts up input shift clock pulses h from the gate $G_2$. When the count i at this counter 112 has reached "7", its logical "1" output is fed to the register full flag 114 via a gate $G_3$ and the gate $G_5$. The gate $G_3$ produces an output j.

Thus conditioned, the register full flag 114 is reset by the next clock pulse a thereby closing the gate $G_2$.

In this way, the bit counter 112 stops its operation when it has counted up eight shift clock pulses h to return to the count "0". While the bit counter 112 is counting up eight shift clock pulses h, the scanner 10 and serial to parallel conversion register 106 receive eight shift clock pulses h individually. The Q output of the register full flag 114 is denoted m in the drawing. The scanner 10 responds to the train of shift clock pulses h to feed a video signal q to the binary circuit 100. This video signal q is passed to the peak hold 102 and to the comparator 104 bypassing the peak hold 102. The resultant binary output of the comparator 104 is loaded in the serial to parallel conversion register 106 in synchronism with the shift clock pulses h. The 8-bit video data inputted to the register 106 are delivered through the tri-state buffer 108 to the data buses of the CPU 40.

Upon arrival of the next read strobe g, the register full flag 114 will again be reset resulting in appearance of another 8-bit train of shift clock pulses h.

According to the procedure described, one line of video signal is supplied from the shift register inside the scanner 10 to the binary circuit 100 eight bits at a time in response to successive read strobes g. Each eight bits of video data now in a binary format are transformed into parallel 8-bit data by the serial to parallel conversion register 106 and tri-state buffer 108. In the case of an original document having a sheet size or format B4, one line of video data will be stored in the RAM 50 in parallel each by eight bits in response to 256 read strobes in total which will appear from the CPU 40.

If the CPU 40 does not produce a read strobe g after the line sync flag 116 has produced an output d or horizontal scan sync signal $d_2$, the read strobe latch 118 remains reset by the $\overline{Q}$ output of the line sync flag 116. As a result, the free run mode flag 120 is set at the buildup of the $Q_{11}$ output n of the 12-bit timing counter 110. When so set, the free run mode flag 120 makes its $\overline{Q}$ output f logical "1" which constantly keeps the register full flag 114 reset. This in turn keeps the gate $G_2$ opened so that shift clock pulses h are supplied continuously to the scanner 10. The output of the gate strobe latch 118 is denoted e in the drawing.

Figure 4:
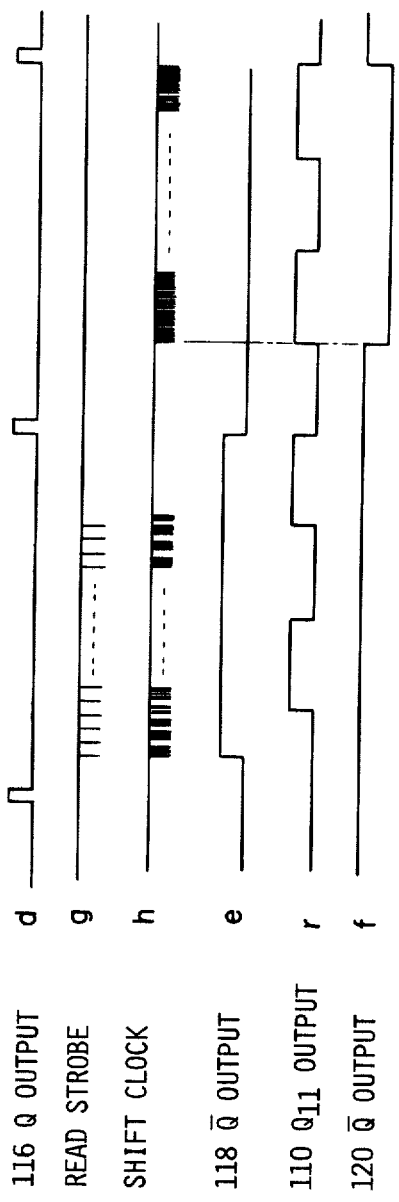

More specifically, as shown in the timing chart of FIG. 4, if the CPU 40 is ready to load the RAM 50 with video data when the line sync flag 116 has produced an output d, shift clock pulses h will appear intermittently in response to read strobes g from the CPU 40 so as to store video data in the RAM 50 eight bits at a time. However, if the CPU is not prepared for loading the RAM 50 with video data, the $\overline{Q}$ output f of the free run mode flag 120 will forcibly reset the register full flag 114 causing the shift clock pulses h to appear continuously.

It follows that the scanner 10 is supplied with a parallel transfer clock pulse $d_1$ and then with shift clock pulses h even when no video data are to be loaded in the RAM 50 by the CPU. This permits the shift register inside the scanner 10 to always store a video signal of an adequate level which precisely conforms to video information carried on the original document scanned by the scanner. This precludes a situation heretofore experienced that only parallel transfer of a video signal to the shift register within the scanner is repeated without any output of video signal from the shift register.

Whether the CPU 40 is ready to take in video data or not, the binary circuit 100 is necessarily supplied with a video signal within a predetermined period of time. Hence, the peak hold circuit 102 can maintain a proper level of output voltage which ensures delivery of correct binary data from the binary circuit 100.

Video data are inputted in the serial to parallel conversion register 106 even when the CPU 40 rejects to load the RAM 50 with data. It will be apparent, however, that the input data in the register 106 will not be delivered to the data bus unless a read strobe g arrives at the tri-state buffer 108 and, therefore, they will not affect the operation of the CPU 40 at all.

As will be seen from the above, video data are surely fed to the binary circuit 100 from the scanner 10 within a given period of time regardless of the time period necessary for the CPU 40 to code the previous data. This always allows binary data with fidelity to video information to be subjected to serial to parallel conversion and stored in the RAM 50.

Figure 5A:
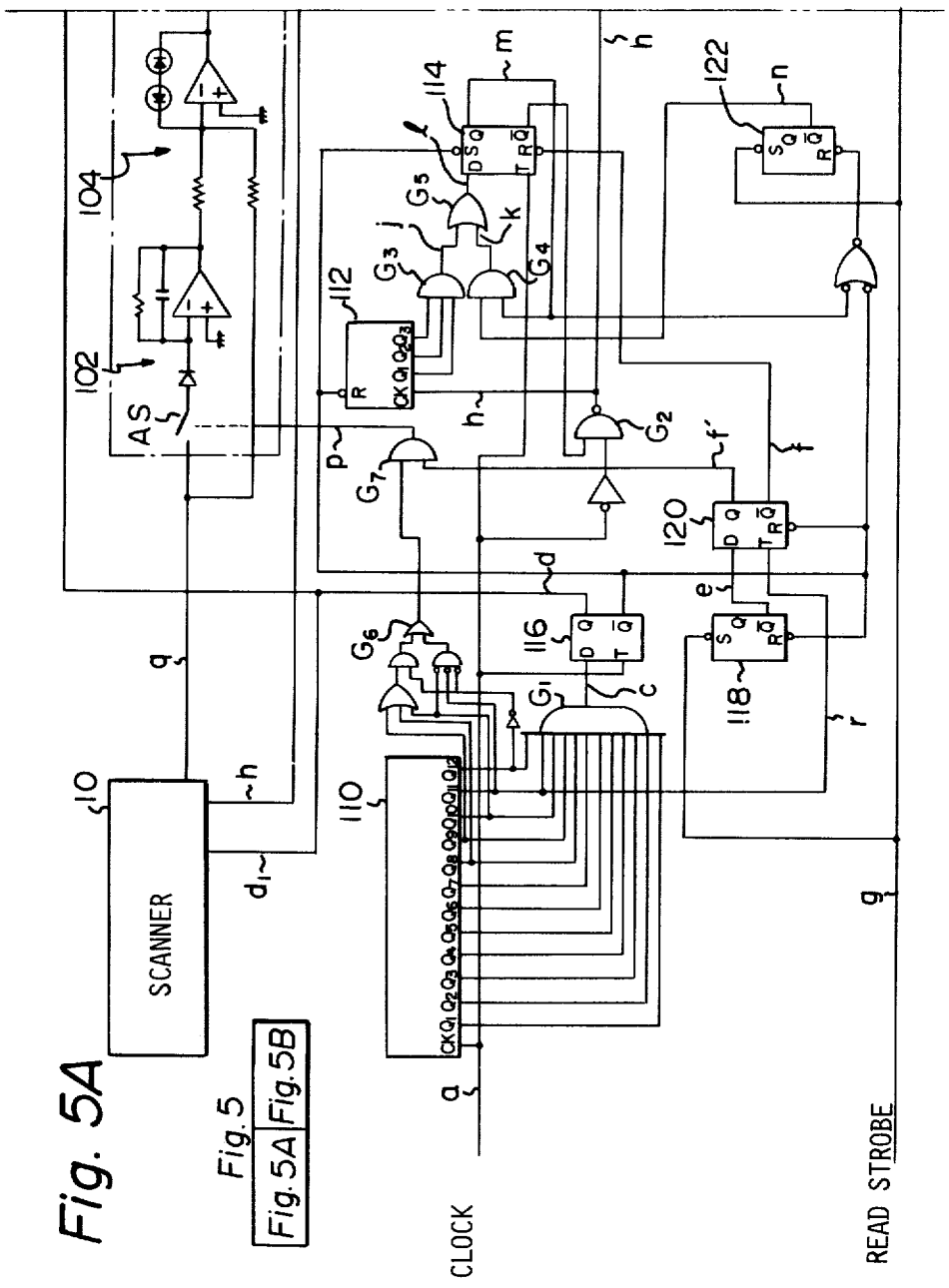
FIG. 5 is a diagram showing a scanner, a serial to parallel converter and a control circuit for the converter of a modification to the embodiment of FIG. 2.
Figure 5B:
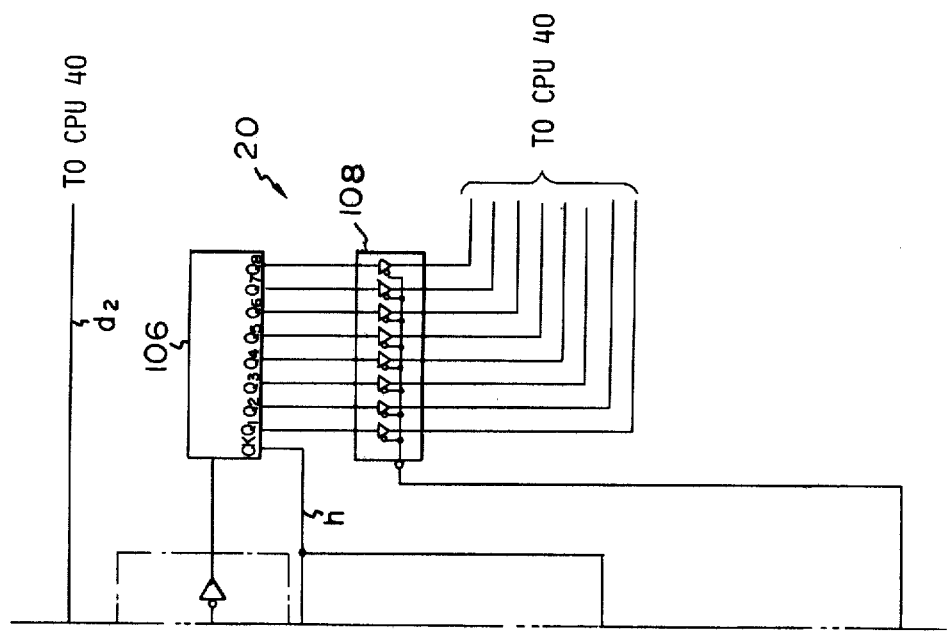
Figure 6:
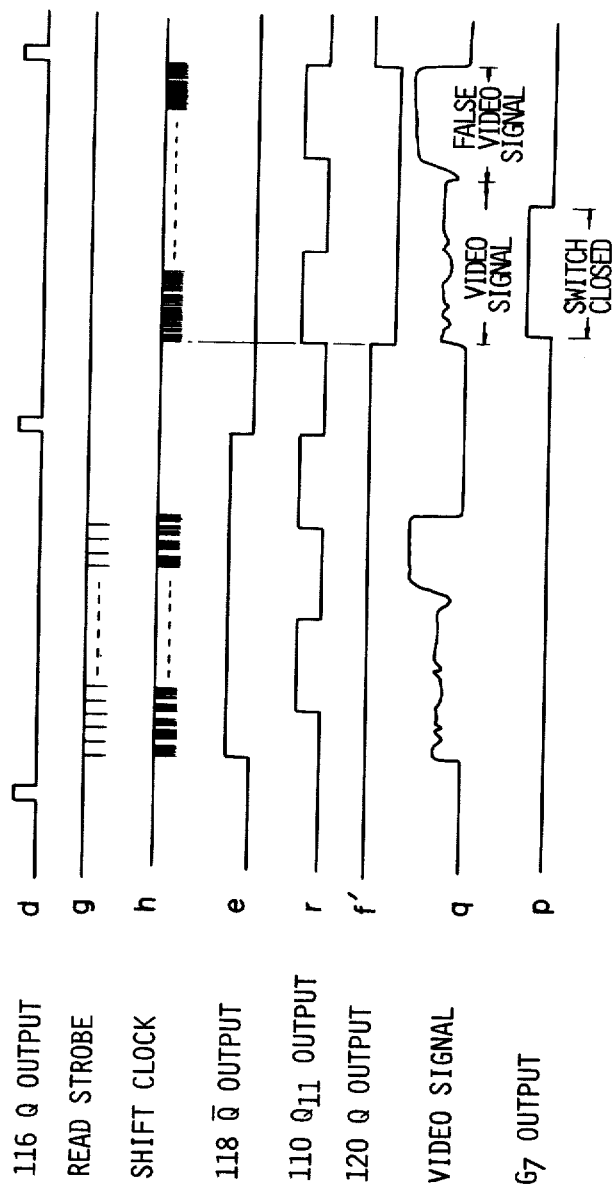
FIG. 6 is a timing chart explanatory of the operation of the modified apparatus shown in FIG. 5.

Reference will now be made to FIGS. 5 and 6 for describing a modified form of the circuit arrangement shown in FIG. 2 and discussed hereinabove. The same reference numerals and characters denote the same circuit elements and signals.

The modified arrangement is essentially similar to the arrangement of FIG. 2 except for additional provision of an analog switch AS at the input side of the peak hold 102 of the binary circuit 100 and gates $G_6$, $G_7$ adapted to control the operation of the analog switch AS. The operation of the modified arrangement will be described hereinafter.

In exactly the same way as in the first arrangement, the 12-bit timing counter 110 counts up clock pulses a coupled thereto continuously as viewed in FIG. 3. Every time the count b at the counter 110 reaches "4096", the counter 110 opens the gate $G_1$ to supply the line sync flag 116 with its output c. The line sync flag 116 produces an output d in response to the input c from the counter 110, that is, output d of the line sync flag 116 appear at given intervals which correspond to those of the output c of the counter 110. The output d of the line sync flag 116 is fed to the scanner 10 as a parallel transfer clock pulse $d_1$ whereby video signals are transferred in parallel to the shift register inside the scanner 10.

At the same time, the output d of the line sync flag 116 is passed as a horizontal scan sync signal $d_2$ to the CPU 40 to thereby interrupt the CPU. If the CPU 40 has fully coded one line of previously inputted video data and is ready to take the next one line of video data in the RAM 50, it will deliver a read strobe g to the circuitry of FIG. 5 in response to the input signal $d_2$. If the CPU 40 is not ready to do so, the read strobe g will not appear therefrom until the next horizontal scan sync signal $d_2$ is coupled thereto. Thus, when the CPU 40 is prepared to take in video data, a read strobe g will necessarily appear within a predetermined period of time after the appearance of a horizontal scan sync signal $d_2$.

In response to a read strobe g, the $\overline{Q}$ output n of the read strobe latch 122 turns into logical "0" and this output n is fed through the gates $G_4$, $G_5$ to the register full flag 114 to reset it. Consequently, the gate $G_2$ is opened to supply shift clock pulses h to the scanner 10 and serial to parallel conversion register 106.

The timing or bit counter 112 counts up input shift clock pulses h from the gate $G_2$. When the count i at the counter 112 has reached "7", its logical "1" output is fed to the register full flag 114 via the gates $G_3$, $G_5$.

Thus conditioned, the register full flag 114 is reset by the next clock pulse to in turn close the gate $G_2$.

In this way, the bit counter 112 stops its operation when it has counted eight shift clock pulses h to have a count "0". While the bit counter 112 is counting up eight shift clock pulses h, the scanner 10 and serial to parallel conversion register 106 receive eight shift clock pulses h individually.

The scanner 10 responds to the train of input shift clock pulses h to feed a video signal g to the binary circuit 100. At this instant, the analog switch AS at the input side of the peak hold 102 of the binary circuit 100 remains opened due to the absence of the output of the gate $G_7$. Under this condition, a video data output of the scanner 10 is coupled only to the comparator 104 bypassing the peak hold circuit 102. At the same time, the peak hold 102 supplies the comparator 104 with a threshold value which it prepared on the basis of the peak of the video signal previously inputted and held therein. Accordingly, the video signal output of the scanner 10 is processed by the comparator 104 into a binary format based on the threshold value, whereupon it is loaded in the register 106 synchronized with shift clock pulses h.

The 8-bit video data inputter in the register 106 is delivered through the tri-state buffer 108 to the data bus of the CPU 40.

Upon arrival of the next read strobe g, the register full flag 114 will again be reset resulting in appearance of another 8-bit train of shift clock pulses h.

According to the procedure described, one line of video signal is supplied from the shift register inside the scanner 10 to the binary circuit 100 eight bits at a time in response to successive read strobes g. Each eight bits of video data now in a binary format are transformed into parallel 8-bit data by the serial to parallel conversion register 106 and tri-state buffer 108. In the case of an original document having a format B4, one line of video data will be stored in the RAM 50 in parallel each by eight bits in response to 256 read strobes in total which will appear from the CPU 40.

If the CPU 40 does not produce a read strobe g after the line sync flag 116 has produced an output d which is a horizontal scan sync signal $d_2$, the read strobe latch 118 remains reset by the $\overline{Q}$ output of the line sync flag 116. As a result, the free run mode flag 120 is set at the buildup of the $Q_{11}$ output r of the 12-bit timing counter 110.

When the free mode flag 120 is set, its Q output f' opens the gate G7 while its $\overline{Q}$ output f resets the register full flag 114 and thereby opens the gate G2. Upon the opening of the gate G7, a logical "1" output passed through the gate G6 is coupled to the analog switch AS of the peak hold 102 while the count at the counter 110 increments from "1152" to 2560". The logical "1" output designated p in the drawing functions to close the analog switch AS. When the gate G2 is opened on the other hand, clock pulses a are passed through this gate G2 resulting in continuous generation of shift clock pulses h.

More specifically, as shown in the timing chart of FIG. 6, the CPU 40 produces read strobes g successively if the CPU 40 is ready to load video data in the RAM 50 when the output d of the line sync flag 116 has appeared. In response to these read strobes g, the gate G2 produces shift clock pulses h intermittently eight pulses at a time so that, as already discussed, the CPU 40 takes in the video data by each eight bits, or eight bits at a time.

If the RAM 50 cannot accept any video data on the other hand, the free run mode flag 120 is set to in turn forcibly reset the register full flag 114 with its $\overline{Q}$ output f. The result is continuous appearance of shift clock pulses h. At the same time, the Q output of the free run mode flag 120 causes the gate G7 to deliver an output p which will close the analog switch AS for a predetermined period of time.

It follows that the scanner 10 is supplied with a parallel transfer clock pulse d1 and then with shift clock pulses h even when no video data are to be loaded in the RAM 50 by the CPU. This permits the shift register inside the scanner 10 to always store a video signal of an adequate level which precisely conforms to video information carried on the original document scanned by the scanner. This eliminates a situation heretofore experienced that only parallel transfer of a video signal to the shift register within the scanner is repeated without any output of video signal into the shift register.

It will be recalled that shift clock pulses h appear continuously while the CPU is out of data loading operation. Based on these shift clock pulses h, the peak hold 102 picks up the components within a predetermined range out of a video signal q outputted from the scanner 10 and shown in FIG. 6, while the output P is appearing from the gate G7 to keep the switch AS closed; the peak hold 102 holds a peak of such specific components of a video signal alone. The peak hole 102 can therefore prepare an adequate threshold value in accordance with the format of a desired original document. For instance, when a document of the minimum format is layed on a support of the facsimile apparatus, the peak hold 102 is prevented from preparing an erroneous threshold value in response to a video signal output of the scanner 10 which might include a component representative of a document presser plate.

To always ensure the utmost accuracy of the peak value and binary data, the scanning rate of the scanner 10 may be preselected to be sufficiently higher than the data transmission rate of the modem 70 while, in combination, artifical periods may be scheduled positively in which the CPU 40 stops loading the RAM 50 with video data. The schedule may be such that the CPU 40 is deactivated once for two successive horizontal scan sync signals d2. Such a design will supply the peak hold 102 with a video signal necessarily within a given period of time.

It will be appreciated from the above that the modification shown in FIG. 5 provides correct outputs corresponding to an original document because it causes the scanner 10 to produce a video signal surely after the appearance of a horizontal scan sync signal. Also, an adequate threshold value is achieved because input video signals correspond to an original document of the minimum format. Furthermore, such an adequate threshold value is always maintained because a video signal is inputted in the peak hold circuit 102 without fail within a given period of time. Binary data exact to the document can thus be always subjected to serial to parallel conversion and stored in the RAM 50.

Various modifications will become possible for those skilled in the art after receiving the teachings of the present disclosure without departing from the scope thereof.

What is claimed is:

1. A facsimile apparatus having a random access memory and a microprocessor for encoding data from the random access memory, comprising:
   scanner means for producing a serial image or video data output;
   binary circuit means for producing a serial binary video data output from the serial video data output of the scanner means;
   serial to parallel converter means for converting the serial binary video data output to a parallel binary video data output, the microprocessor being constructed to produce a read strobe when the parallel binary video data output can be inputted to the random access memory after encoding the previous data from the random access memory;
   sync signal generator means for producing a sync signal at a predetermined interval, the microprocessor being constructed to produce the read strobe in response to the sync signal;
   shift clock pulse generator means for producing shift clock pulses in response to the read strobe from the microprocessor, the scanner being constructed to feed the serial video data output to the binary circuit means in response to the shift clock pulses; and
   control means for controlling the shift clock pulse generator to forcibly produce the shift clock pulses which are fed to the scanner means whether or not the parallel binary data output can be inputted to the random access memory.

2. A facsimile apparatus as claimed in claim 1, in which the scanner means comprises a shift register responsive to the shift clock pulses to feed the serial video data output to the binary circuit means.

3. A facsimile apparatus as claimed in claim 1, in which the binary circuit means comprises a peak value holding circuit and a comparator.

4. A facsimile apparatus as claimed in claim 1, in which the serial to parallel converter means comprises a serial to parallel converter register responsive to the serial binary video data output to convert the same to the parallel binary video data output, and a tri-state buffer responsive to the read strobe to feed the parallel binary video data output to the microprocessor.

5. A facsimile apparatus as claimed in claim 1, in which the sync signal generator means comprises a timing pulse counter for counting clock pulses, and gate circuit means responsive to outputs of the timing pulse counter and the clock pulses to produce the sync signal at the predetermined interval.

6. A facsimile apparatus as claimed in claim 5, in which the gate circuit means comprises an AND gate and a line sync flag.

7. A facsimile apparatus as claimed in claim 1, in which the shift clock pulse generator means comprises a read strobe latch responsive to the read strobe from the microprocessor to produce an output, and gate circuit means responsive to the output of the read strobe latch to produce the shift clock pulses.

8. A facsimile apparatus as claimed in claim 7, in which the shift clock pulse generator means further comprises a counter for counting the shift clock pulses to produce an output which is fed to the gate circuit means when the count in the counter reaches a predetermined value, whereby the gate circuit means stops producing the shift clock pulses.

9. A facsimile apparatus as claimed in claim 6, in which the control means comprises a read strobe latch which is reset by an output of the line sync flag of the sync signal generator means, and a free run mode flag which is set by an output of the timing pulse counter of the sync signal generator means to produce an output which is fed to the shift clock pulse generator means which then produces the shift clock pulses in succession.

10. A facsimile apparatus as claimed in claim 3, in which the binary circuit means further comprises an analog switch connected between the scanner means and the peak value holding circuit for inhibiting the serial video data output from being fed from the scanner means to the peak value holding circuit at an interval which is shorter than the predetermined interval at which the sync signal is produced, and a control drive circuit for controllably driving the analog switch, said control drive circuit comprising a gate unit responsive to selected outputs of the timing pulse counter and an AND gate responsive to an output of the gate unit and an output of the control means to produce an output by which the analog switch is closed.

11. A facsimile apparatus as claimed in claim 1, further comprising a modem, a scanning speed of the scanner means being set to a speed which is greater than a data transmission speed of the modem to thereby decrease the number of times of producing the read strobe from the microprocessor when the sync signal is fed to the microprocessors.

12. A facsimile apparatus including scanner means for producing serial analog video signals in response to shift pulses, shift pulse generator means for producing the shift pulses, binary circuit means for converting the analog video signals into binary video signals and computing means for operating on the binary video signals in a predetermined manner, characterized by comprising:

sync signal generator means for generating and feeding a sync signal to the scanner means and the computing means, the computing means being constructed to generate a read strobe in response to the sync signal only if the computing means is in a condition to operate on the binary video signals; and control means for gating a predetermined number of shift pulses from the shift pulse generator means to the scanner means in response to the read stroke, the control means being further constructed to continuously gate shift pulses from the shift pulse generator means to the scanner means when a predetermined period of time has elapsed after generation of the sync signal and the computing means has not generated the read strobe.

13. A facsimile apparatus as in claim 12, in which the binary circuit means comprises peak hold circuit means.

14. A facsimile apparatus as in claim 13, further comprising switch means, the control means being further constructed to control the switch means to prevent the analog video signals from being input to the peak hold circuit means for predetermined length of time in response to continuous gating of the shift pulses from the shift pulse generator means to the scanner means.

* * * * *